United States Patent Office 3,157,544
Patented Nov. 17, 1964

3,157,544
METHOD OF MAKING PLASTIC LINED WOVEN
FABRIC HOSE
Frank Lichtey, Saddle River, N.J., assignor to United
States Rubber Company, New York, N.Y., a corporation of New Jersey
Filed July 11, 1960, Ser. No. 42,160
1 Claim. (Cl. 156—148)

This invention relates to a method of making covered fabric hose. More particularly, the invention relates to a method of continuously producing, in indefinite running lengths, a fabric-reinforced hose, covered on its inner or outer surface, or on both surfaces, with an impervious polymeric material, such as a vinyl resin composition.

We are aware of U.S. Patent No. 1,327,677 issued to Kennedy on January 13, 1920, which discloses lining a fabric tube with a plastic composition. The present invention is directed to an improved process involving the use of a thixotropic plastic composition, as will be made clear hereinafter.

We are also aware of U.S. Patent No. 2,647,296, issued to Shive on August 4, 1953, which discloses making tubular insulation by applying a coating of vinyl plastisol to a fabric tube. The present invention is directed to improvements associated with the use of thixotropic compositions, and associated with the use of internal air pressure to prevent pin holes, particularly in the lining of hose.

One object of the invention is to provide a method of making fabric hose, lined or externally covered with vinyl plastic or other polymeric composition, in a continuous process in which the operation of applying the lining and/or outer covering is essentially combined with the operation of producing the tubular fabric which constitutes the reinforcement for the hose.

Another object is to provide a method of making lined or exteriorly covered fabric hose in a rapid and economical fashion, without resort to discontinuous or batch-wise operations.

Still another object is to provide a method which permits the application of a smooth, continuous outer covering or lining of predetermined, uniform thickness, which method can be operated continuously over prolonged periods of time without encountering undesirable variations in the thickness of the covering.

It is yet another object of the invention to provide a method of lining fabric hose which avoids the formation of pin holes or similar voids or punctures in the internal covering, during the process of applying and fusing or setting the polymeric covering.

Additional objects and advantages of the invention will be made manifest in the following detailed description, which is intended to be read with reference to the accompanying drawings, wherein.

Figure 1:
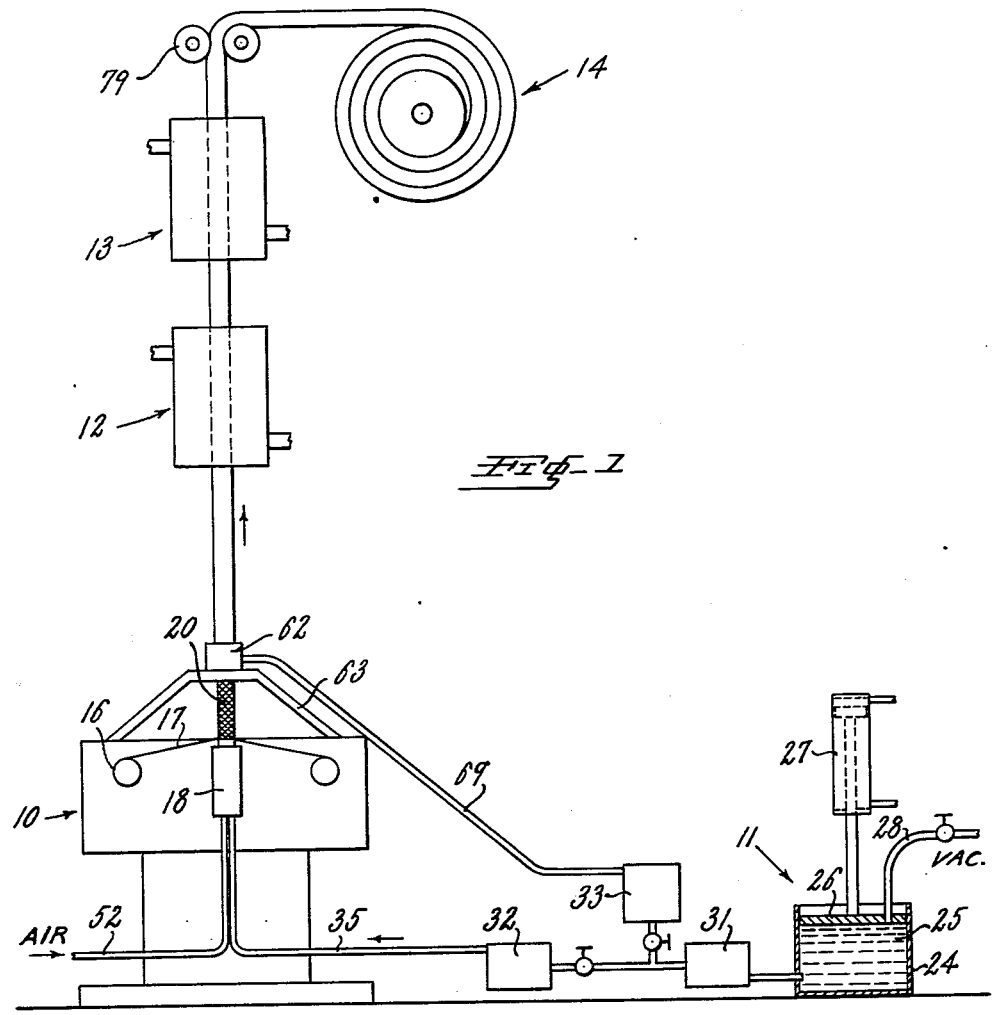
FIG. 1 is a diagrammatic elevational view, with parts broken away and parts shown in section, of one arrangement of apparatus suitable for carrying out the invention.

In general, the invention contemplates essentially combining the operation of lining or externally covering a fabric hose with the operation of producing the fabric, that is, the lining and/or outer covering of polymeric material is applied to the tubular fabric representing the textile reinforcement of the hose, as such tubular fabric leaves the weaving device in which the tubular fabric is produced. The machine for making the tubular fabric may be any suitable conventional weaving or similar yarn interlacing machine generally used for making fabric hose, in which category we include braiders for making braided tubular fabric, and circular looms for making woven tubular fabric, as well as knitters for making knitted tubular fabric. As is well known, in such devices the textile material is usually contained initially in the form of yarns (in which category we include both monofilaments and multifilaments, made either of natural fibers such as cotton or linen, or typical synthetic fibers such as rayon, nylon, polyester fiber, etc.), wound on supply bobbins or shuttles, or the like, which are generally disposed in a more or less circular arrangement, and from which a plurality of the yarns are directed generally radially inwardly to an essentially central interlacing area, where the yarns are combined to form a braided, woven, or knitted fabric tube of the desired diameter. In accordance with the invention, a polymeric composition, which has thixotropic flow properties, and which will be described in more detail below, is introduced, for the purpose of forming a covering on the inside surface of the fabric tube, through a suitable conduit or passageway extending from an outside supply point, along a path located generally radially inwardly of the yarn supplies, and thence into the interior of the fabric tube, where the plastic composition is discharged just beyond the point at which the yarns become interlaced to form such tube, in the direction of movement of the tube. The tubular fabric thus formed is continuously led away or advanced under constant tension from the area at which the yarns are interlaced, at a rate which is the same as the speed with which the tube is formed. The device may be arranged either horizontally, in which case the fabric tube is conducted away essentially along a horizontal plane, or it may be arranged to operate vertically, in which case the tube is withdrawn from the device vertically, either upwardly or downwardly, depending on the desired arrangement of the machine.

In a preferred practice of the invention the plastic or similar polymeric composition from which it is desired to form the lining is discharged from an annular orifice directly against the interior surface of the fabric tube, immediately beyond the point at which the yarns are interlaced to form the tube. Immediately beyond the annular orifice from which the plastic or other polymeric composition is thus discharged there is defined, between the inner surface of the fabric tube and a concentric fixed member, an annular passageway which has a thickness that is preferably equal to or somewhat greater than the thickness of the desired lining. At an area spaced beyond the annular discharge opening for the polymeric composition, the thus-defined annular passageway terminates in a reservoir represented by a greatly enlarged annular area, which has an outer diameter equal to the inside diameter of the fabric tube, and which has an inner diameter that is less than the diameter of the central rigid member which defines the restricted annular passageway. There is thus formed an enlarged annular space for the polymeric composition, which has a much greater thickness than the thickness of the desired lining, and which is maintained fully charged with the polymeric composition throughout the lining operation. Beyond this enlarged area or reservoir for maintaining an excess supply of polymeric material, in the direction of movement or advancement of the fabric tube, there is defined, between the inner surface of the fabric tube and the outer surface of a concentrically disposed rigid member, an annular passageway which is of greatly reduced thickness in comparison with the enlarged space or reservoir, and which has a thickness corresponding to the desired thickness of the lining. This concentric member serves as a kind of wiping device, and the action is such that as the fabric tube moves past this device, a covering of the polymeric material, having the desired thickness, is provided on the interior surface of the fabric tube.

The interior of the lined fabric tube is inflated at a moderate positive pressure, by means of air or other suitable gas, introduced from a compressor or equivalent supply located outside of the machine and connected to the interior of the tube by a conduit or passageway extending generally centrally of the yarn-interlacing device and of the described arrangement for applying the polymeric composition, which conduit or passageway opens into or terminates in the interior of the lined fabric tube.

If it is desired to apply in addition an external covering, the thus-lined fabric tube is immediately thereafter passed through a cylindrical guiding member having an inside diameter corresponding to the outside diameter of the fabric tube. Concentrically of this guiding member there is provided an annular space or reservoir, which is maintained charged with the polymeric composition under positive pressure. An annular discharge orifice, at the termination of the cylindrical guiding member, directs the polymeric composition under pressure from this reservoir onto the outer surface of the fabric tube, just as the fabric tube passes beyond the cylindrical guiding member. Beyond such annular discharge orifice there is disposed an annular wiping ring or die, having an internal diameter which is larger than the external diameter of the fabric tube, by an amount essentially equal to the desired thickness of the external covering.

The thus coated and lined fabric tube, still containing positive air pressure in its interior, is then conducted without interruption continuously through a heating device wherein the temperature of the assembly is raised to a sufficient extent and for a sufficient length of time to convert the polymeric composition into a solid substance.

The polymeric compositions employed in the invention are non-newtonian fluids, that is, they are liquids having a viscosity which varies with the applied shear stress. The polymeric compositions employed are further characterized as thixotropic substances, that is, their viscosity is reduced upon deformation. The polymeric compositions which we employ may be described as having a consistency similar to that of mayonnaise, that is, they are gels or pastes, which, when applied for example to a vertical surface, will not flow or sag of their own weight, but will remain in place in essentially the applied shape for an indefinite period of time. At the same time, such gelled polymeric compositions are readily flowable under the influence of applied pressure, and they are easily directed through conduits or orifices, and will readily take a desired shape when directed into such shape by moderate force. The fluid polymeric gels employed have another advantageous characteristic, in that they essentially retain an imparted shape even upon being heated to elevated temperature. This is particularly advantageous in the present process, in that there is no undesirable tendency for the polymeric composition to sag, run, or thin out when the assembly is heated to elevated temperature to set the plastic.

A preferred polymeric composition in the form of a thixotropic gel for use in the invention is represented by the materials known in the art as plastigels. Such materials are forms of plastisols. Plastisols are dispersions of themoplastic resins, usually vinyl resins such as polyvinyl chloride resin, in particulate form in a liquid plasticizer, such as dioctyl phthalate, which is a relatively poor solvent for the resin at ordinary temperatures, but in which the resin dissolves at elevated temperatures. Such plastisols are converted into plastigels by the addition of suitable conventional materials, notably certain fillers which have a gelling action. We prefer to use as the plastigel a vinyl resin plastisol to which there has been added dimethyldioctadecyl ammonium bentonite as the gelling agent. This gelling agent is commercially available under the name "Bentone." Like a plastisol, the plastigel is converted into a solid, non-fluid state by heating the composition to fusion temperature, in the conventional manner. However, the plastigel is unlike the plastisol in that the plastigel is thixotropic, and will not run or sag during the heating operation. A remarkable advantage of the preferred vinyl plastigel made with dimethyldioctadecyl ammonium bentonite resides in the fact that the plastigel substantially retains the same consistency over a relatively prolonged period of time at ordinary temperatures, that is, it does not increase in viscosity. Therefore, the plastigel may be prepared in reasonably large batches, and may be employed continuously in the present process over a period of days, without uncontrollable and undesired variations in the thickness of the covering applied to the fabric tube. It will be understood that undesired changes in the consistency of the polymeric material during the operation of the process would result in corresponding unpredictable and undesired changes in the thickness of the covering, so that it would be virtually impossible to produce consistently a uniform product that would meet desired, exacting specifications.

A specific example of a suitable plastigel formulation is as follows.

| Ingredient: | Part by weight |
|---|---|
| Powered polyvinyl chloride resin | 100 |
| Dioctyl phthalate (plasticizer) | 100 |
| Tricresyl phosphate (plasticizer) | 15 |
| Stabilizers (e.g., zinc stearate, barium cadmium stearate) | 3 |
| Dimethyldiotadecyl ammonium bentonite (gelling agent) | 6 |

It will be understood that the basic plastisol formulation may be varied considerably in accordance with conventional practice to obtain a desired viscosity. Any suitable conventional plasticizers, stabilizers, and secondary compounding ingredients may be employed in accordance with conventional practice, together with coloring materials if desired. When using the preferred gelling agent, dimethyldioctadecyl ammonium bentonite, the amount of such gelling agent frequently ranges from 4 to 15 parts, per 100 parts of vinyl resin, but other quantities may be used. The foregoing plastigel may be fused by heating at a temperature within the range of, for example, from about 350 to 475° F. for a period of time ranging, for example, from about 2 to 10 minutes. Further details of plastigel formulation are given in the "Bentone Handbook," published by the National Lead Company, 105 York Street, Brooklyn, New York, in 1953.

It is preferred that the gelled polymeric composition employed in the invention have a viscosity within the range of from 250,000 centipoises to 1,000,000 centipoises. The viscosity is conveniently measured on the Brookfield viscometer, using for example a No. 7 spindle (typically an average value is taken at speeds ranging from 0.5 to 100 r.p.m.).

If desired, other polymeric compositions of thixotropic nature, capable of being fused or cured or vulcanized, or otherwise "set" in a desired final, solid shape, typically with the aid of at least moderate heating, may be used. Thus, polychloroprene rubber compositions, particularly those based on the material known as liquid or low molecular weight polychloroprene, may be formulated with curatives and fillers such as whiting to form a gel which is thixotropic and which can be applied to the fabric tube in the manner herein described, and thereafter cured to a permanently solid state by heat. Similarly, thixotropic compositions based on butadiene-acrylonitrile rubber latex, chlorosulfonated polyethylene rubber, or silicone polymer rubber (which may be formulated for cure at room temperature), may be employed.

Figure 2:
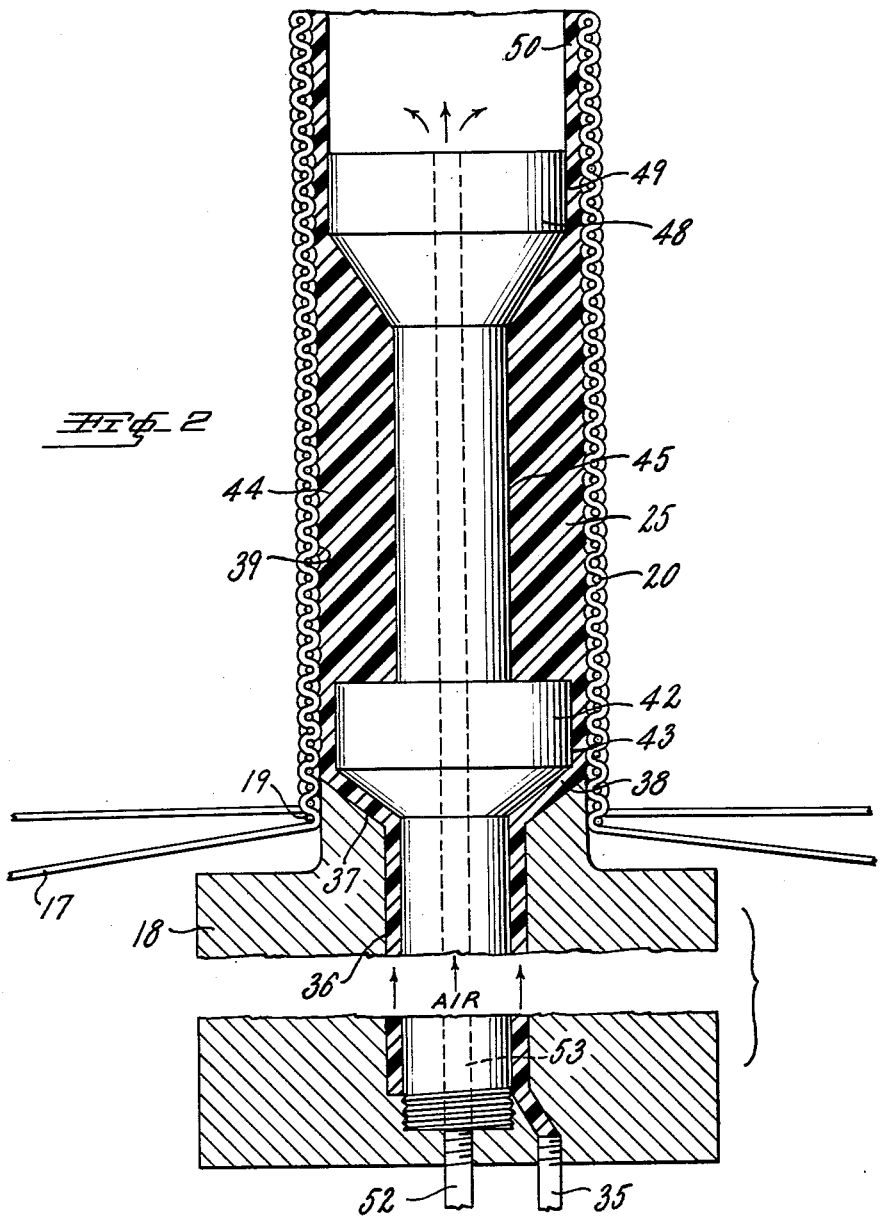
FIG. 2 is an enlarged, fragmentary, sectional elevational view of a portion of the device of FIG. 1, showing a lining of polymeric material being applied to a fabric tube.

Referring to the drawings, and in particular to FIG. 1, there is shown therein a conventional braiding machine 10, which is supplied with a polymeric composition, such as the above-described vinyl plastigel from a supply and pumping arrangement 11, and from which the the plastic covered hose is delivered through a heating device 12 and then to a cooling device 13, and finally to a windup device 14. The braider typically includes a plurality of spindles 16 disposed in generally circular fashion within the machine, from which a plurality of warp textile yarns 17 are passed generally radially inwardly to a weaving pin 18 where they become interlaced with a fill yarn 19 (FIG. 2) at a braiding area located essentially centrally of the machine, thus forming a tubular fabric 20 which is withdrawn continuously from the weaving area as fast as it is formed.

The arrangement 11 for supplying the plastic material includes a main reservoir or supply tank 24, containing the vinyl plastigel 25 or similar thixotropic gel, which is fitted with a movable piston 26 actuated by a cylinder 27 in such manner as to apply positive displacing pressure (e.g., 250 p.s.i.) on the plastic. For removing entrapped bubbles of air and the like from the plastic, the piston 26 is fitted with a vacuum line 28 by means of which suction may be applied to the plastic composition in the supply tank for a period of time before operation is begun. The plastic passes from the supply tank to a first pump 31, from which the plastic flows to either or both of two metering pumps 32, 33 one of which (32) delivers the plastic to the interior of the tube to form a lining, and the other of which (33) delivers the plastic to the exterior of the fabric tube to form a coating. The metering pumps deliver the plastic material at a desired pressure (e.g., about 500 to 800 p.s.i.) and at a carefully controlled constant rate, sufficient to supply the amount of material required for the plastic coverings of the particular desired thickness. The rate of delivery of the plastic and the rate of advancement of the fabric tube are coordinated so that the lining is neither too thin nor too thick.

A conduit 35 extends from one of the metering pumps 32 into the central portion of the braiding machine where it communicates with an annular passageway 36 (FIG. 2) in the weaving pin 18. Toward the upper end of the weaving pin the annular passageway for the plastic has an outwardly extending portion 37 terminating in an annular orifice 38 which is directed essentially against the inner surface 39 of the fabric tube 20 at a place located just beyond (in the direction of travel of the fabric tube) the point where the tube is formed.

A rigid central member 42 supported concentrically within the arrangement is provided with a cylindrical face or surface 43 that is parallel to and spaced from the interior surface 39 of the fabric tube by a distance that is preferably at least equal to or slightly greater than the thickness of the desired plastic lining. The cylindrical face or surface 43 thus represents a constriction located between the orifice 38 and an enlarged area or reservoir 44 defined between the interior surface of the tube and the surface of a portion 45 of the rigid central member 42 having a reduced diameter. Under the influence of the pressure applied to the plastic material 25, such plastic completely fills the reservoir 44 under substantial positive pressure at all times during operation of the device. This area represent a kind of accumulator area that aids in preventing formation of a lip or similar marking when starting or stopping the machine.

Beyond the reservoir 44 (in the direction of travel of the tube) an enlarged portion 48 of the central rigid member 42 present another cylindrical surface 49 (sizing die surface) parallel to the interior surface of the fabric tube 20, and spaced therefrom by a distance substantially equal to the thickness of the desired plastic lining 50. The enlarged portion 48 thus serves as a kind of wiping pin or sizing die, and determines the actual thickness of the plastic lining.

It is important to note that the consistency of the vinyl plastigel is such that the lining 50 does not impregnate the fabric tube 20 completely, that is, the plastic material does not penetrate substantially into the interior of the fabric although the plastic is applied under sufficient pressure to interlock with the surface fibers, so that the plastic lining is firmly attached to the interior surface of the fabric tube, without appreciably impairing the flexibility of the fabric tube, and without destroying the ability of the yarns to move with respect to each other. The plastic material is forced into the interstices between the yarns but does not actually impregnate the yarns themselves. This not only insures substantial retention of the flexibility of the fabric but it also aids in providing a more uniform covering on the interior. The pressure at which the plastic is applied is carefully controlled to avoid striking through of the plastic to the outside of the fabric tube, which would produce a rough surface on the exterior.

It is important to note that the annular orifice 38, supplied by the annular passages 36, 37, and the reservoir 44 and sizing die surface 49, are so arranged that there is a continual, essentially smooth and uninterrupted forward advancement of plastic with no opportunity for occurrence of voids or entrapped air bubbles.

During the operation air is introduced under appreciable pressure (e.g., about 5 to 8 ounces per square inch) through a conduit 52 that communicates with a central passageway 53 extending longitudinally of the inner rigid member 42. In this way the interior of the lined hose is maintained under positive pressure. This has been found to be particularly advantageous from the standpoint of preventing blisters or voids in the lining, which otherwise tend to occur during heating of the assembly if internal air pressure is not maintained. Moisture contained in the fabric is a particular source of such voids.

Figure 3:
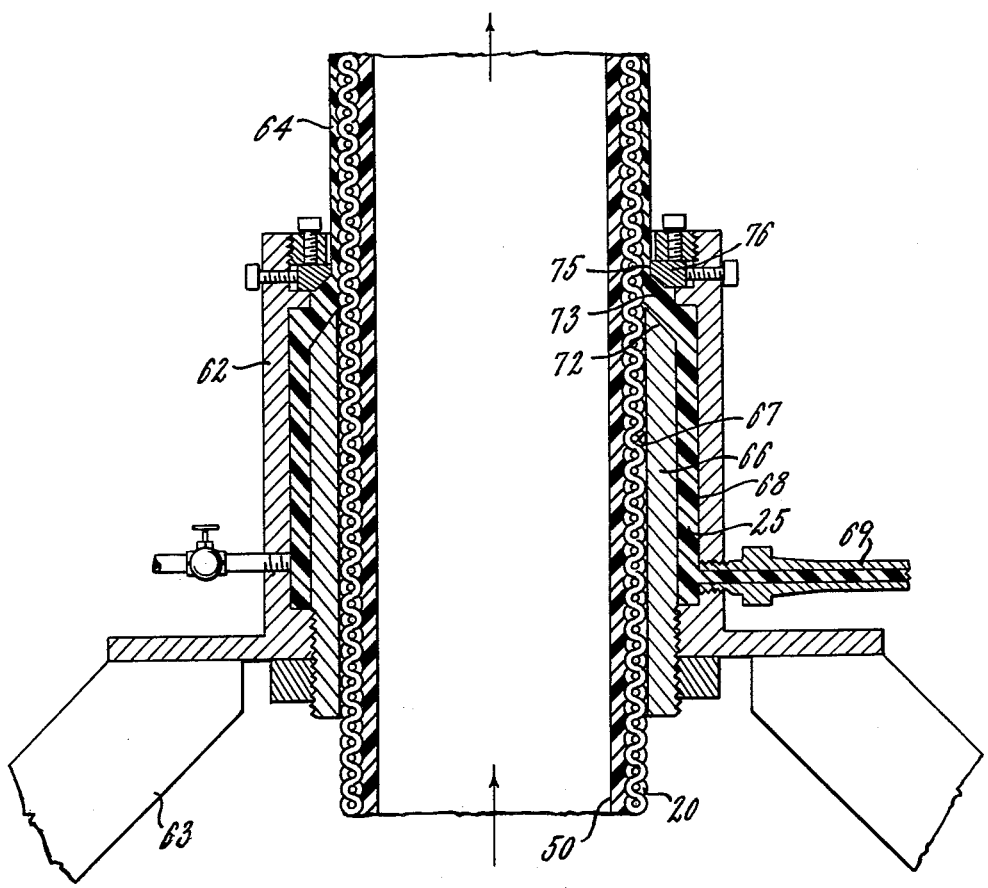
FIG. 3 is a similar view showing an external covering of polymeric material being applied over the lined fabric tube.

The assembly of tubular fabric 20 and plastic lining 50 is then passed through a cylindrical housing 62 (FIGS. 1 and 3) supported on a bracket 63 extending upwardly from the braiding machine, for the purpose of applying an outer plastic covering 64 to the assembly. The arrangement for applying the plastic cover includes an inner cylindrical guide member 66 having a cylindrical passageway 67 corresponding in diameter to the outside diameter of the tube.

Between the outer surface of the cylindrical guide 66 and the inner surface of the outer cylindrical housing 62 there is defined a reservoir or annular space 68 which is maintained filled with the plastic composition 25 under a pressure of about 300 to 500 p.s.i., supplied through a conduit 69 leading from the metering pumps 33 (FIG. 1).

The annular reservoir 68 communicates with a radially inwardly extending annular passageway 72 which terminates, at the upper end of the cylindrical guide, in an annular die orifice 73 disposed against the outer face of the fabric tube. The pressurized plastic composition is thus pressed against the outer surface of the fabric 20 under a positive pressure of about 300 to 500 p.s.i.

The assembly is then drawn through an annular die opening 75 defined between the inner surface of a die ring 76 and the outer surface of the fabric tube 20. The spacing between the inner surface of the die ring and the outer surface of the fabric is substantially equal to the thickness of the desired plastic cover 64.

The thus exteriorly coated and interiorly lined fabric hose thereafter passes through the heating device 12 (FIG. 1), wherein it may be heated by means of circulating hot air, or by equivalent heating means, in such manner that the plastigel formulation becomes fused, and the plastic is converted into a solid, non-flowable state. After the heating operation, the hose is passed through the cooling device 13, through which cooling air may be circulated, and after the hose has become sufficiently cool it is drawn through pair of pinch rollers 79 between which the hose is essentially flattened, and then the hose may be wound up on a driven reel 14. The pinch rollers substantially collapse the hose so that passage of air through the interior of the hose is restricted, thus aiding in maintaining the desired positive air pressure within the hose during the lining operation.

By the use of the present process there may be applied to the fabric hose, whether braided, woven or knitted one or more coverings, in which category we include both exterior coverings and interior coverings (linings) of impervious polymeric material having virtually any desired suitable thickness, including coatings of relatively heavy gauge, such as coatings of the order of 30 to 100 mils, or even heavier. The invention is particularly advantageous from the standpoint of providing a smooth, uniform lining that offers minimum resistance to flow of a fluid within the hose, and yet is continuous and impervious to such fluid, while the hose is highly flexible. The manner in which the lining is applied in carefully predetermined and uniform amount, at a constant, carefully controlled pressure, coordinated with the rate of formation and advancement of the fabric tube, is especially advantageous. The use of a thixotropic composition, which does not change in viscosity and which has no undesirable tendency to run or sag when heated, is particularly important from the standpoint of forming a smooth, uniform coating. It is desired to emphasize that the use of internal air pressure, as described, is of particular importance from the standpoint of preventing formation of pin holes and the like in the lining.

Having thus described my invention, what I claim and desire to protect by Letters Patent is:

A method of continuously producing an indefinite length of hose, reinforced with tubular fabric, having an inner surface and an outer surface, at least one of which surfaces is covered with a smooth, continuous and fluid-impervious covering of plastic material having a uniform thickness, comprising in combination the steps of providing a vinyl resin plastigel in the form of a thixotropic gel having a viscosity of from 250,000 to 1,000,000 centipoises, continuously interlacing fibrous textile yarns together to form a tubular fabric reinforcement, continuously advancing the said tubular fabric, continuously metering the said plastigel under a pressure of about 500 to 800 p.s.i. to a surface of the advancing tubular fabric that it is desired to cover in the form of a covering of a definite desired thickness, said plastigel interlocking with surface fibers of the said yarns and extending into interstices between the yarns, the interior spaces between the fibers of the yarns being devoid of plastigel, continuously introducing air under a pressure of about 5 to 8 ounces per square inch into the interior of the advancing tubular fabric, heating the tubular fabric to a temperature of from 350° to 475° F. for a period of time of from about 2 to 10 minutes to fuse the plastigel while continuing to advance the tubular fabric, and subsequently cooling the tubular fabric.

References Cited in the file of this patent

UNITED STATES PATENTS

| | | |
|---|---|---|
| 1,949,476 | Kennedy | Mar. 6, 1934 |
| 2,019,709 | Kennedy | Nov. 5, 1935 |
| 2,100,587 | Chalker | Nov. 30, 1937 |
| 2,602,959 | Fenlin | July 15, 1952 |
| 2,647,296 | Shive | Aug. 4, 1953 |
| 2,647,488 | Shive | Aug. 4, 1953 |
| 2,759,864 | Kuebler | Aug. 21, 1956 |
| 2,872,349 | Hunn | Feb. 3, 1959 |
| 3,018,755 | Metcalf | Jan. 30, 1962 |

FOREIGN PATENTS

| | | |
|---|---|---|
| 840,630 | Great Britain | July 6, 1960 |

OTHER REFERENCES

Citation in Organic Finishing, December 1950, "Dispersion Coatings," pp. 11–15.